(12) United States Patent
Subramanya et al.

(10) Patent No.: US 7,344,773 B2
(45) Date of Patent: Mar. 18, 2008

(54) METHODS OF FORMING NANOPARTICLE BASED MONOLAYER FILMS WITH HIGH PARTICLE DENSITY AND DEVICES INCLUDING THE SAME

(75) Inventors: Kolake Mayya Subramanya, Gyeonggi-do (KR); In-seok Yeo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 181 days.

(21) Appl. No.: 11/190,214

(22) Filed: Jul. 26, 2005

(65) Prior Publication Data
US 2006/0099430 A1 May 11, 2006

(30) Foreign Application Priority Data
Nov. 9, 2004 (KR) .................. 10-2004-0090780

(51) Int. Cl.
*B32B 7/04* (2006.01)
(52) U.S. Cl. .................. 428/338; 428/401; 428/447; 428/448; 428/548; 428/553; 428/559
(58) Field of Classification Search .................. None
See application file for complete search history.

(56) References Cited

U.S. PATENT DOCUMENTS

| 6,410,149 B1 | 6/2002 | Hendricks et al. |
| 2004/0071924 A1 | 4/2004 | Yang et al. |
| 2004/0203256 A1 * | 10/2004 | Yang et al. .................. 438/780 |

FOREIGN PATENT DOCUMENTS

| JP | 2003-147417 A | | 5/2003 |
| JP | 2005-92939 A | * | 4/2005 |
| KR | 10-2003-0083913 | | 11/2003 |

OTHER PUBLICATIONS

Hong et al. "Controlled two-dimensional distribution of nanoparticles by spin-coating method" *Applied Physics Letters* 80(5):844-846 (2002).
Kodama et al. "Disk substrate deposition techniques for monodisperse chemically synthesized FePt nanoparticle media" *Applied Physics Letters* 83(25):5253-5255 (2003).

* cited by examiner

*Primary Examiner*—Marc S. Zimmer
(74) *Attorney, Agent, or Firm*—Myers Bigel Sibley & Sajovec

(57) ABSTRACT

The present invention provides methods of forming uniform nanoparticle based monolayer films with a high particle density on the surface of a substrate comprising (a) forming a surface modifying layer on a substrate using a material comprising a first functional group that chemically binds to the substrate and a second functional group comprising a group capable of forming van der Waals forces, (b) applying to the surface modifying layer a solution comprising nanoparticles, and (c) curing the resultant structure formed at step (b) for a predetermined time to form a nanoparticle based monolayer film. The present invention further provides substrates and devices comprising the nanoparticle based monolayer films.

34 Claims, 5 Drawing Sheets

METHODS OF FORMING NANOPARTICLE BASED MONOLAYER FILMS WITH HIGH PARTICLE DENSITY AND DEVICES INCLUDING THE SAME

CROSS-REFERENCE TO RELATED APPLICATION

This application claims priority to Korean Patent Application No. 2004-0090780, filed Nov. 9, 2004, the disclosure of which is incorporated herein by reference in its entirety as if set forth fully herein.

FIELD OF THE INVENTION

The present invention relates to methods of forming nanoparticle based monolayer films and devices including the same.

BACKGROUND OF THE INVENTION

Interest has developed in the use of nanoparticle films in the fabrication of high-performance electronic devices. For example, studies have been conducted concerning the application of nanoparticle films in fabrication of high-performance semiconductor devices, such as single electron transistors and floating gate field effect transistors, large capacity magnetic recording media, etc.

Further interest in these studies pertains to the formation of a nanoparticle based monolayer film with a particle density as high as $10^{12}$ particles/cm$^2$ or more. Another interest is in the uniform formation of a nanoparticle based monolayer film with high particle density ($10^{12}$ particles/cm$^2$ or more) formed on the entire surface of a substrate having a large surface area such as an 8- or 12-inch wafer. Uniform formation of a nanoparticle based monolayer film with high particle density on a large-scale substrate is desirable for cost-effective mass production of high-performance semiconductor devices.

A method of forming a nanoparticle film using spin-coating is discussed in Hong et al. "Controlled two-dimensional distribution of nanoparticles by spin-coating method", Applied Physics Letters 80(5): 844-846 (2002). According to Hong et al., a colloidal solution of Co and Ag nanoparticles in toluene and ethanol may be applied onto a Si or SiO$_2$ wafer. Subsequently, the wafer may be spun at a predetermined rate (RPM) in order to disperse the colloidal nanoparticles and to deposit a uniform nanoparticle film across a large area of the wafer. The density of nanoparticles including the nanoparticle film can be controlled by varying the concentration of the colloidal nanoparticles. However, this method of nanoparticle film formation by spin-coating may have several disadvantages, for example, the particle density of a nanoparticle based monolayer film to be achieved may be limited. As shown in Hong et al. at FIG. 1, as the particle concentration of a colloidal solution increases, the particle density on a Si or SiO$_2$ substrate increases. Also, according to Hong et al., a further increase of the molar concentration of the colloidal solution results in the formation of three-dimensional nanoparticle clusters. Thus, a bi- or multi-layered nanoparticle film is formed instead of a nanoparticle based monolayer film with a higher particle density.

Furthermore, Hong et al. states that the substrate surface be wet with the colloidal solution in order to form a uniform nanoparticle film. As a result, this method may restrict the type of substrate and the type of colloidal solution solvent that can be used.

Kodama et al. discuss a method of forming a FePt alloy film using a spin coater in "Disk substrate deposition techniques for monodisperse chemically synthesized FePt nanoparticle media," Applied Physics Letters 83(25):5253-5255 (2003). According to this method, a substrate is moved to a clean chamber by a robot, after which the clean chamber may be sealed and filled with hexane (and hexane gas to prevent the evaporation of the hexane). Then, a dispersion solution of the FePt particles in hexane is applied to the substrate, which is then spun using the spin coater. The spinning rate is increased to uniformly deposit the FePt particles on the entire surface of the substrate. While Kodama et al. describes the formation of a FePt alloy film, it is silent about the formation of a FePt alloy monolayer film. Further, the method employed in Kodama et al. refers to complicated process equipment and, in general, is not a cost-effective process.

U.S. Patent Application Publication No. 2004/0071924A1 to Yang et al. discusses a method of forming a nanoparticle based monolayer film in which nanoparticles are deposited on the chemically modified patterned regions of the substrate so that the nanoparticles self-assemble on the patterned regions and chemically bind with the substrate. At least one drawback to the method of Yang et al. may be that a nanoparticle layer is limitedly formed on predetermined regions of the substrate. Thus, the nanoparticle layer may only be formed only on the patterned regions of the substrate, not on the entire surface of the substrate. Consequently, this method may be applied to a post-patterning deposition process rather than a post-deposition patterning process.

A further drawback may be that the surface modifying layer (SML) chemically binds directly with the nanoparticles. As a result of the direct chemical bond between the SML and the nanoparticles, a bi- or multi-layered nanoparticle film may also be formed, in addition to a nanoparticle based monolayer film.

SUMMARY OF THE INVENTION

Embodiments of the present invention provide methods of forming uniform nanoparticle based monolayer films with a high particle density on a large scale and in a cost-effective manner, and devices including the films.

In particular, embodiments of the present invention provide a method of forming a nanoparticle based monolayer film comprising (a) forming a surface modifying layer on a substrate using a material comprising a first functional group that chemically binds to the substrate and a second functional group comprising a group capable of forming van der Waals forces; (b) applying to the surface modifying layer a solution comprising nanoparticles; and (c) curing the resultant structure formed at step (b) for a predetermined time to form a nanoparticle based monolayer film. In some embodiments, the solution further comprises a surfactant that forms a capping film around the nanoparticles, wherein the capping film forms a van der Waals bond with the surface modifying layer.

Further embodiments of the present invention provide a substrate comprising a nanoparticle based monolayer film, wherein the substrate comprises a surface modifying layer formed using a material comprising a first functional group that chemically binds to the substrate and a second functional group comprising a group that forms van der Waals forces, and further comprises a nanoparticle based monolayer film, wherein the nanoparticle based monolayer film is attached to the surface modifying layer through van der Waals forces.

Embodiments of the present invention further provide a device comprising a nanoparticle based monolayer film, comprising a substrate, a surface modifying layer formed on the substrate using a material comprising a first functional group that chemically binds to the substrate and a second functional group comprising a group that forms van der Waals forces; and a nanoparticle based monolayer film formed on the surface modifying layer by binding with the surface modifying layer through van der Waals forces.

DETAILED DESCRIPTION

Figure 1:
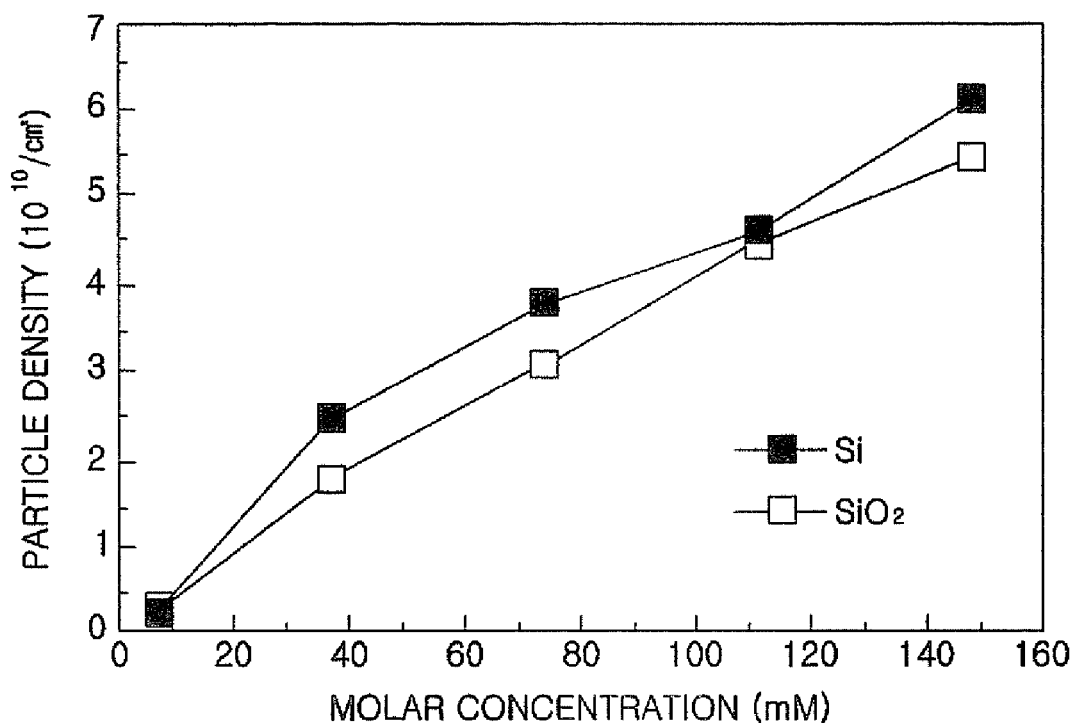
FIG. 1 illustrates the relationship between the particle density of the Ag nanoparticles (20 nm) and the molar concentration of the colloids on Si and $SiO_2$ wafers using a conventional spin-coating method as presented in Hong et al. (Applied Physics Letters 80(5): 844-846 (2002)).
Figure 2:
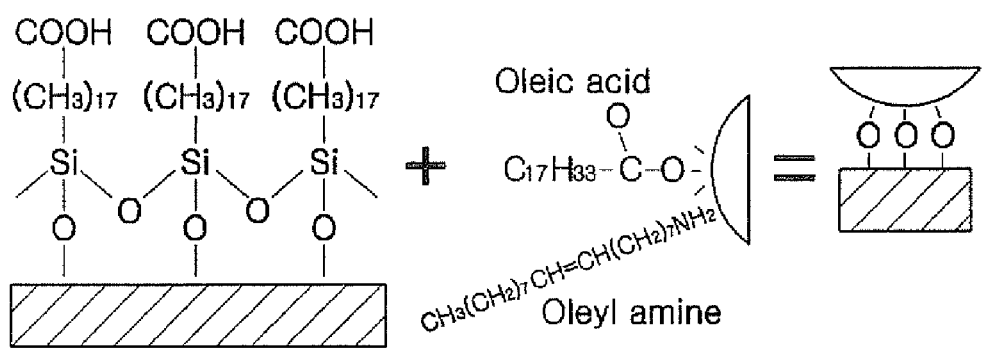
FIG. 2 illustrates the chemical bonding of nanoparticles to chemically modified patterned regions of a substrate as presented in U.S. Patent Application Publication No. 2004/0071924A1 to Yang et al.

The present invention will now be described more fully herein with reference to the accompanying drawings, in which embodiments of the invention are shown. This invention, however, may be embodied in many different forms and should not be construed as being limited to the embodiments set forth herein. Rather, these embodiments are provided so that this disclosure will be thorough and complete and will fully convey the concept of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

Unless otherwise defined, all terms, including technical and scientific terms used in the description of the invention, have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Moreover, it will be understood that steps comprising the methods provided herein can be performed independently or at least two steps can be combined. Additionally, steps comprising the methods provided herein, when performed independently or combined, can be performed at the same temperature and/or atmospheric pressure or at different temperatures and/or atmospheric pressures without departing from the teachings of the present invention.

In the drawings, the thickness of layers and regions are exaggerated for clarity. It will also be understood that when a layer is referred to as being "on" another layer or substrate or a reactant is referred to as being introduced, exposed or feed "onto" another layer or substrate, it can be directly on the other layer or substrate, or intervening layers can also be present. However, when a layer, region or reactant is described as being "directly on" or introduced, exposed or feed "directly onto" another layer or region, no intervening layers or regions are present. Additionally, like numbers refer to like compositions or elements throughout.

Embodiments of the present invention are further described herein with reference to cross-section illustrations that are schematic illustrations of idealized embodiments of the present invention. As such, variations from the shapes of the illustrations as a result, for example, of manufacturing techniques and/or tolerances, are to be expected. In particular, the regions illustrated in the figures are schematic in nature and their shapes are not intended to illustrate the precise shape of a region of a device and are not intended to limit the scope of the present invention.

As will be appreciated by one of skill in the art, the present invention may be embodied as compositions and devices including the compositions as well as methods of making and using such compositions and devices.

Figure 3A:
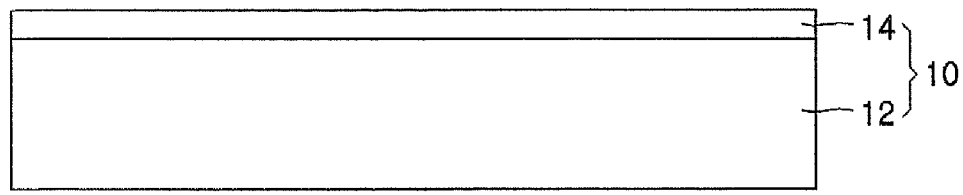
FIGS. 3A through 3E present sequential sectional views illustrating methods of forming a nanoparticle based monolayer film according to some embodiments of the present invention.

FIGS. 3A through 3E are schematic sequential sectional views that illustrate methods of forming a nanoparticle based monolayer film according to some exemplary embodiments of the present invention. Specifically referring to FIG. 3A, a substrate 10 may be prepared. The substrate 10 may be a single substrate such as a semiconductor substrate comprising, for example, silicon, silicon germanium, SiC or the like, a disc substrate for magnetic recording media, a glass substrate, or a composite substrate in which one or more material films or material film patterns are formed on the single substrate. For the latter, the material films or material film patterns may be formed using, for example, a metal material including, but not limited to, Au and Ag, an insulating material including, but not limited to, silicon oxide, silicon nitride, or silicon oxinitride, a high dielectric material, a polysilicon or metal silicide material, a glass or indium tin oxide (ITO). As shown in FIG. 3A, for example, the substrate 10 may include a monocrystalline silicon substrate 12 and a silicon oxide film 14 formed on the monocrystalline silicon substrate 12. While FIG. 3A illustrates the substrate 10 with a non-patterned planarized surface, the uppermost surface of the substrate 10, for example, the silicon oxide film 14, may be formed with a predetermined pattern, such as a trench.

Figure 3B:
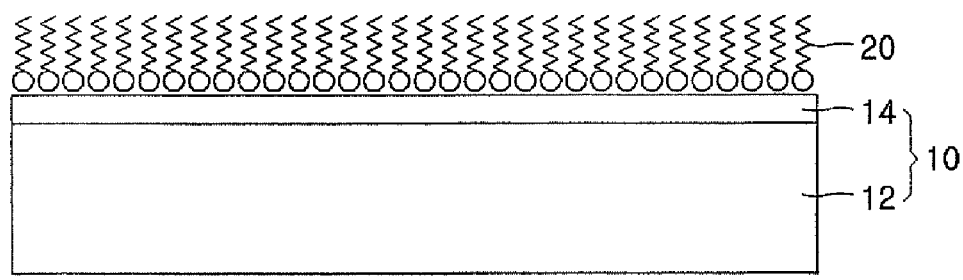
Figure 4A:
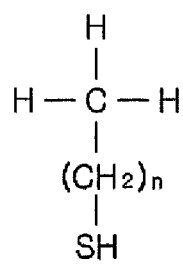
FIGS. 4A through 4C present structures of exemplary compounds used in formation of a surface modifying layer according to some embodiments of the present invention.
Figure 4B:
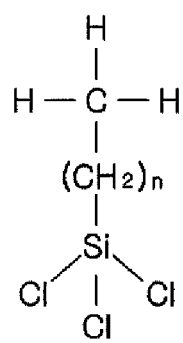
Figure 4C:
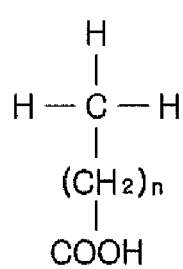

Referring to FIG. 3B, a surface modifying layer 20 may be formed on the substrate 10 using a conventional material film deposition method. In some embodiments according to the invention, the surface modifying layer 20 may be a compound comprising two or more functional groups. One of the functional groups may chemically bind with an exposed material on the upper surface of the substrate 10 and another functional group may be a —$CH_3$ group. The former functional group may vary according to the type of the exposed material on the upper surface of the substrate 10. For example, in some embodiments where a metal is exposed on the upper surface of the substrate 10, the former functional group may be —SH. In some embodiments where silicon oxide is exposed on the upper surface of the substrate 10, the former functional group may be —COOH, silane, or —$NH_2$. The —$CH_3$ group has little or no chemical affinity with nanoparticles as will be described later, and thus, exhibits little or no chemical binding with the nanoparticles. Exemplary compounds that can be used in formation of the surface modifying layer 20 are illustrated in FIGS. 4A through 4C.

For some embodiments according to the present invention, a method of forming the surface modifying layer 20 is to deposit a self-assembled monolayer on the entire surface or predetermined patterned regions of the substrate 10. The self-assembled monolayer may include a compound including alkylsiloxanes, alkylsilanes, alkylthiols and the like. In some embodiments according to the invention, the self-assembled monolayer may also be a compound having an end functional group including —OH, —CHO, —COOH, —SH, —CONH, and —$NH_2$ and the other end functional group including —$CH_3$.

Figure 3C:
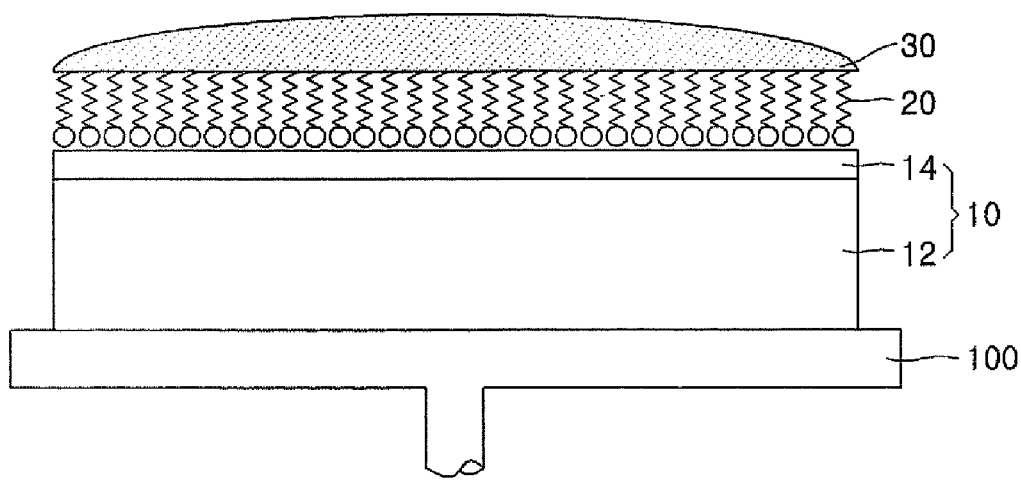

Referring to FIG. 3C, the substrate 10 on which the surface modifying layer 20 is formed may be positioned on a substrate support 100 for spin-coating, and a deposition solution 30 comprising chemically synthesized nanoparticles may be applied to the surface modifying layer 20 using a solution coating method such as potting. The deposition solution 30 may be applied to the entire surface of the substrate 10. The deposition solution 30 may be a solution in which nanoparticles of a material including a nanoparticle based monolayer film may be uniformly dispersed in a solvent or a surfactant.

In some embodiments of the present invention, the nanoparticles in the deposition solution 30 are fine particles with a particle size of 100 nm or less. The nanoparticles may be fine particles with a particle size of 30 nm or less. Futhermore, the nanoparticles may have a uniform particle size. Additionally, the nanoparticles may have an average particle size distribution of ±15%.

Various types of nanoparticles can be used in embodiments according to the present invention. More specifically, nanoparticles may be derived from a chemical material that does not directly chemically bind with an end functional group of the surface modifying layer 20, to the end functional group, for example, a —$CH_3$ group. Additionally, the nanoparticles may be derived from a metal material comprising, for example, Au, Ag, Fe, Ni, Fe, Pd, Pt, Co, and/or an alloy thereof. Moreover, the nanoparticles may be derived from a semiconductor material comprising, for example, CdS, CdSe, and/or PbSe. In some embodiments of the present invention, the solvent for the deposition solution 30 may be n-hexane, chloroform, toluene, deionized water, ethanol or the like.

Figure 5:
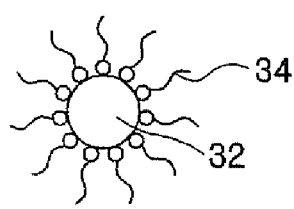
FIG. 5 illustrates a nanoparticle surrounded by a capping film used in formation of a nanoparticle based monolayer film according to some embodiments of the present invention.

According to further embodiments of the present invention, the deposition solution includes a surfactant that forms a capping film around the nanoparticles. The capping film may contribute to the uniform dispersity of the nanoparticles in the solvent. The capping film may include a material that is (a) capable of preventing and/or relieving the flocculation and/or precipitation of the nanoparticles and/or (b) capable of forming a van der Waals bond with a free end functional group of the surface modifying layer 20, such as a —$CH_3$ group. The capping film may be a carbon-based coating film. The carbon based coating film may be formed using a surfactant. FIG. 5 illustrates a coating film including a surfactant 34 surrounding a nanoparticle 32.

Figure 3D:
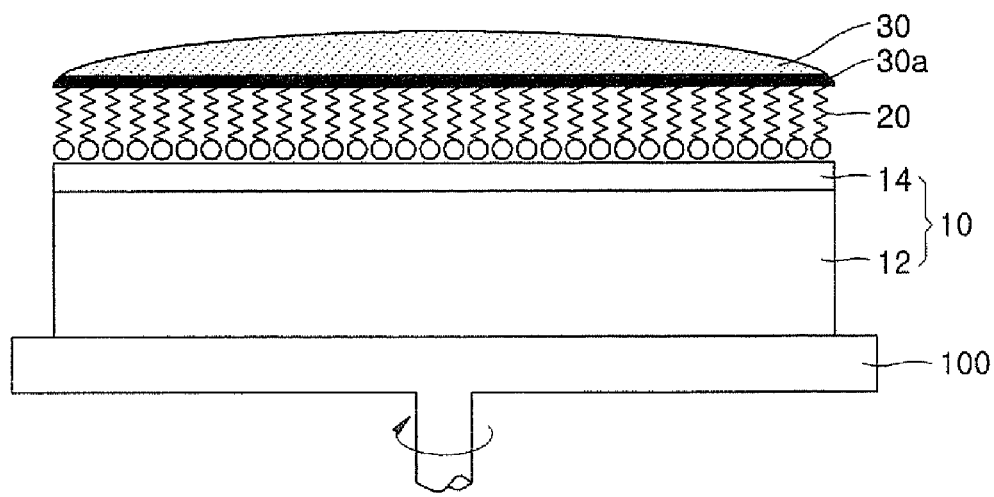

Referring to FIG. 3D, the resultant structure covered with the deposition solution 30 may be left to stand for a predetermined time to perform a curing process. The curing process may form a nanoparticle based monolayer film 30a at a contact portion between the deposition solution 30 and the surface modifying layer 20. The nanoparticle based monolayer film 30a may be formed by the van der Waals force between the —$CH_3$ group of the surface modifying layer 20 and a surfactant (see 34 of FIG. 5) composing the capping film surrounding the nanoparticles (see 32 of FIG. 5). Thus, the —$CH_3$ group may have little to no chemical affinity with the nanoparticles but instead, binds with the surfactant through a van der Waals force. In this instance, the surfactant serves as a particle modifying film that modifies the chemical property of the nanoparticles. The van der Waals bonds may be formed during the curing process.

According to some embodiments of the present invention, the curing process may be performed for a time period in a range from about 3 minutes to about 25 minutes. The curing process may also be performed for a time period in a range from about 3 minutes to about 10 minutes. In general, the curing time may be adjusted so as to avoid a sub-monolayer film with a low particle density or a bi-layer or multi-layer film. The curing process may result in a nanoparticle based monolayer film 30a with a high particle density of about $10^{12}$ particles/$cm^2$ or more at the interface between the surface modifying layer 20 and the deposition solution 30.

Following termination of the curing process, the substrate 10 may be spun for a predetermined time so that the residual deposition solution is removed providing only the nanoparticle based monolayer film 30a. The spinning process may be performed in a range from about 2000 rpm to about 10,000 rpm for a period of time in a range from about 20 seconds to about 300 seconds. The spinning process may be performed in a range from about 5,000 rpm to about 7,000 rpm for a period of time in a range from about 20 seconds to about 300 seconds. In general, the spinning rate may be adjusted so that only the residual deposition solution is removed.

Figure 3E:
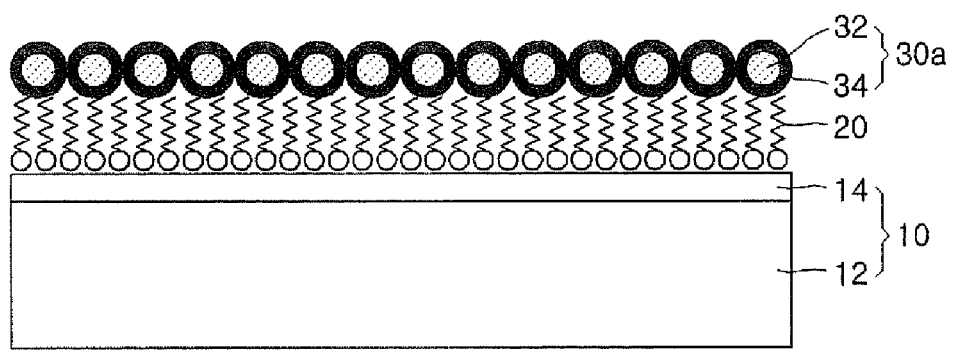

FIG. 3E illustrates a resultant structure obtained after the removal of the residual deposition solution, wherein the nanoparticle based monolayer film 30a including nanoparticles 32 surrounded by a capping film 34 is formed on the surface modifying layer 20.

Figure 6:
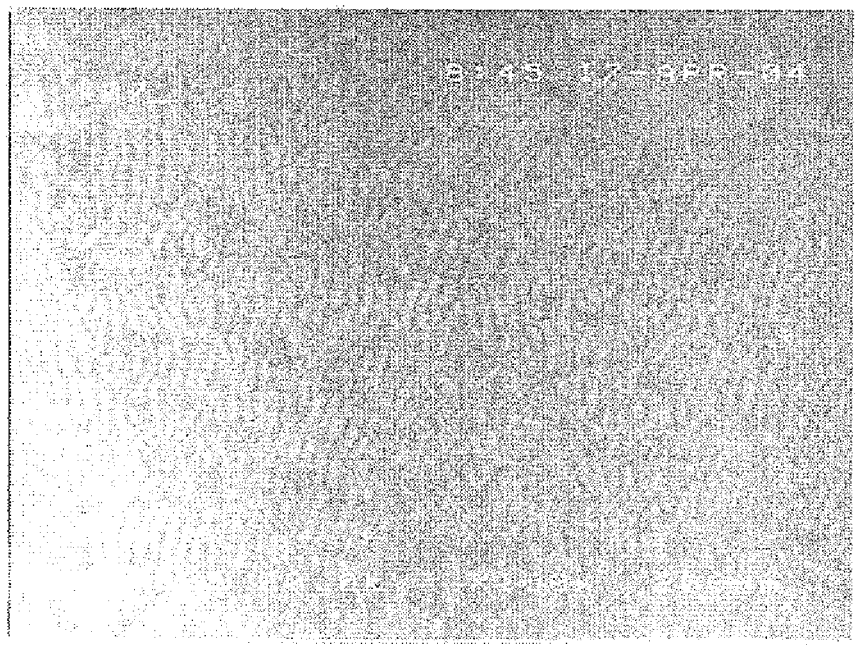
FIG. 6 is a scanning electron microscopic (SEM) image of a Co nanoparticle monolayer film according to some embodiments of the present invention.
Figure 7:
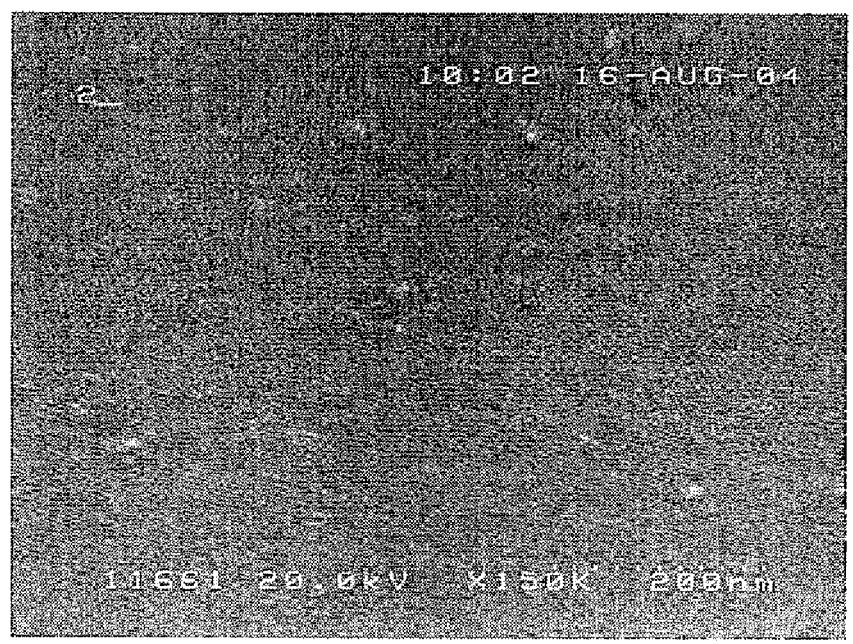
FIG. 7 is a SEM image of a FePt nanoparticle monolayer film according to some embodiments of the present invention.

FIG. 6 and FIG. 7 are respective scanning electron microscopic (SEM) images for a cobalt nanoparticle monolayer film and a FePt nanoparticle monolayer film which are formed on a substrate including a silicon substrate and a silicon oxide film formed on the silicon substrate according to some embodiments of the present invention. In FIG. 6 and FIG. 7, a surface modifying layer was formed using octadecyltrichlorosilane, i.e., $CH_3$—$(CH_2)_{17}SiCl_3$. A curing process was performed for 400 seconds, and a spinning process was performed at 6,000 RPM for 30 seconds. As shown in FIG. 6 and FIG. 7, the nanoparticle based monolayer films are formed with a uniform particle density on the entire surface of a substrate. The monolayer film of FIG. 6 has a cobalt particle density of about $1 \times 10^{12}$ particles/$cm^2$ and the monolayer film of FIG. 7 has a FePt particle density of about $2.42 \times 10^{12}$ particles/$cm^2$. Thus, according to the present invention, a nanoparticle based monolayer film, with a high particle density of $10^{12}$ particles/cm$^2$ or more, can be uniformly formed on the entire surface of a substrate.

Embodiments of the present invention further provide a device including a nanoparticle based monolayer film, comprising a substrate, a surface modifying layer formed on the substrate using a material comprising a first functional group that chemically binds to the substrate and a second functional group comprising a group that forms van der Waals forces and a nanoparticle based monolayer film formed on the surface modifying layer by binding with the surface modifying layer through van der Waals forces.

As apparent from the above description, according to some embodiments of the present invention, a nanoparticle based monolayer film can be formed on both the entire surface and on patterned regions of a substrate. Accordingly, the present invention can be applied to, for example, magnetic recording media manufactured by forming a nanoparticle based monolayer film on patterned regions. As a further example, a nanoparticle based monolayer film formed according to methods of the present invention can be applied to a semiconductor device fabrication technique involving a post-deposition patterning process as well as a semiconductor device fabrication technique including a post-patterning deposition process. Furthermore, a patterned nanoparticle based monolayer film of the present invention can be applied, for example, as a channel layer of a single electronic transistor or as a floating gate of a flash device. Since the nanoparticle based monolayer film can be formed on various types of underlying films or by using various types of nanoparticle materials, the present invention possesses utility for broad applications. Additionally, according to the present invention, conventional process equipment such as a spin-coater can be employed in the methods disclosed herein. Therefore, deceased costs may be incurred with respect to process equipment, and a nanoparticle based monolayer film may be formed on a large-scale and/or in a cost-effective manner.

What is claimed is:

1. A method of forming a nanoparticle based monolayer film comprising:
   (a) forming a surface modifying layer on a substrate using a material comprising a first functional group that chemically binds to the substrate and a second functional group comprising a group capable of forming van der Waals forces;
   (b) applying to the surface modifying layer a solution comprising nanoparticles; and
   (c) curing the resultant structure formed at step (b) for a predetermined time to form a nanoparticle based monolayer film, wherein the nanoparticles are immobilized on the monolayer film by van der Waals interactions.

2. The method of claim 1, wherein the substrate comprises a metal material, an insulating material, a high dielectric material, a polysilicon material, a metal silicide material, or a combination thereof.

3. The method of claim 1, wherein the substrate comprises gold (Au), silver (Ag), silicon (Si), silicon oxide (SiO), glass, indium tin oxide (ITO), or a combination thereof.

4. The method of claim 1, wherein the group forming van der Waals forces comprises $CH_3$.

5. The method of claim 1, wherein applying to the surface modifying layer a solution comprising nanoparticles comprises depositing a self-assembled monolayer.

6. The method of claim 5, wherein the self-assembled monolayer comprises an alkylsiloxane, an alkylsilane, an alkylthiol, or a combination thereof.

7. The method of claim 1, wherein the curing step is performed at an atmospheric pressure in a range from about 3 minutes to about 25 minutes.

8. The method of claim 1, wherein the nanoparticles comprise a particle size of about 100 nm or less.

9. The method of claim 1, wherein the nanoparticles comprise a particle size in a range of about 10 nm to about 30 nm.

10. The method of claim 1, wherein the nanoparticles comprise an average particle size distribution of within about 15 percent.

11. The method of claim 1, wherein the nanoparticles comprise gold (Au), silver (Ag), iron (Fe), nickel (Ni), palladium (Pd), platinum (Pt), cobalt (Co), an alloy thereof or a combination thereof.

12. The method of claim 1, wherein the nanoparticles comprise CdS, CdSe, PbSe, or a combination thereof.

13. The method of claim 1, wherein the solution comprises a solvent or a surfactant.

14. The method of claim 13, wherein the solvent comprises n-hexane, chloroform, toluene, deionized water, or ethanol.

15. The method of claim 1, wherein the solution further comprises a surfactant that forms a capping film around the nanoparticles, wherein the capping film forms a van der Waals bond with the surface modifying layer.

16. The method of claim 15, wherein the surfactant comprises a carbon-based material.

17. The method of claim 1, further comprising removing the solution remaining after formation of the nanoparticle based monolayer film in step (c).

18. The method of claim 1, further comprising spinning the resultant structure formed at step (c) in a range from about 2000 rpm to about 10,000 rpm for a period of time in a range from about 20 seconds to about 300 seconds.

19. The method of claim 1, wherein the nanoparticle based monolayer film is formed on a predetermined region of the substrate.

20. The method of claim 1, wherein the nanoparticle based monolayer film is applied during a post-deposition patterning process or a post-patterning deposition process.

21. The method of claim 1, wherein the nanoparticle based monolayer film has a high particle density of at least about $10^{12}$ particles/cm$^2$.

22. A substrate comprising a nanoparticle based monolayer film, wherein the substrate comprises a surface modifying layer formed using a material comprising a first functional group that chemically binds to the substrate and a second functional group comprising a group that forms van der Waals forces, and further comprises a nanoparticle based monolayer film,
   wherein the nanoparticle based monolayer film is attached to the surface modifying layer through van der Waals forces.

23. The substrate of claim 22, wherein the surface modifying layer is formed by deposition of a self assembled monolayer.

24. The substrate of claim 23, wherein the self-assembled monolayer comprises an alkylsiloxane, an alkylsilane, an alkylthiol, or a combination thereof.

25. The substrate of claim 22, wherein the nanoparticle based monolayer film comprises nanoparticles and a surfactant,
   wherein the surfactant surrounds the nanoparticles and binds to the surface modifying layer through van der Waals forces.

26. The substrate of claim 25, wherein the nanoparticles comprise gold (Au), silver (Ag), iron (Fe), nickel (Ni), palladium (Pd), platinum (Pt), cobalt (Co), an alloy thereof or a combination thereof.

27. The substrate of claim 25, wherein the nanoparticles comprise CdS, CdSe, PbSe, or a combination thereof.

28. A device comprising a nanoparticle based monolayer film, comprising:
   a substrate;
   a surface modifying layer formed on the substrate using a material comprising a first functional group that chemically binds to the substrate and a second functional group comprising a group that forms van der Waals forces; and
   a nanoparticle based monolayer film formed on the surface modifying layer by binding with the surface modifying layer through van der Waals forces.

29. The device of claim 28, wherein the surface modifying layer is formed by deposition of a self-assembled monolayer.

30. The device of claim 29, wherein the self-assembled monolayer comprises an alkylsiloxane, an alkylsilane, an alkylthiol, or a combination thereof.

31. The device of claim 28, wherein the nanoparticle monolayer film comprises nanoparticles surrounded by a capping film, wherein the capping film forms a van der Waals bond with the surface modifying layer.

32. The device of claim 28, wherein the nanoparticles comprise gold (Au), silver (Ag), iron (Fe), nickel (Ni), palladium (Pd), platinum (Pt), cobalt (Co), an alloy thereof or combination thereof.

33. The device of claim 28, wherein the nanoparticles comprise CdS, CdSe, PbSe, or a combination thereof.

34. The device of claim 28, wherein the nanoparticle based monolayer film is formed on an entire surface of the substrate or a predetermined region of the substrate.

* * * * *